Dec. 2, 1930.  P. S. SINCLAIR  1,783,317
BALL BEARING MOUNTING FOR DANDY ROLLS
Filed Feb. 14, 1930
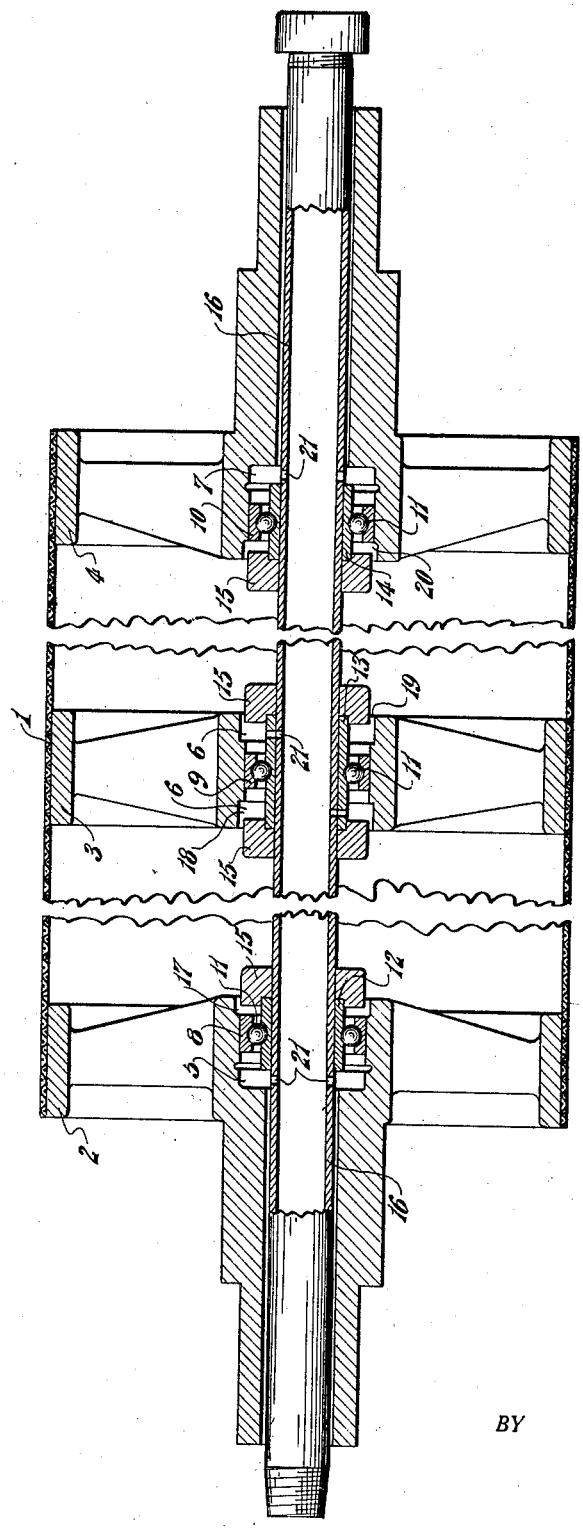
INVENTOR,
Peter S. Sinclair,
BY
Harry W. Bowen.
ATTORNEY.

Patented Dec. 2, 1930

1,783,317

UNITED STATES PATENT OFFICE

PETER S. SINCLAIR, OF HOLYOKE, MASSACHUSETTS

BALL-BEARING MOUNTING FOR DANDY ROLLS

Application filed February 14, 1930. Serial No. 428,340.

This invention relates to improvements in ball bearing mounting for dandy rolls.

An object of the invention is to provide ball bearing means for mounting the dandy roll on a fixed shower pipe.

A further object is to provide means for lubricating the ball bearings directly from the water in a shower pipe.

At the present time, the shower pipe of a dandy roll is loosely mounted in openings in the supporting spiders of the roll. This construction is, at the best, a make shift as it usually results in a loose fit causing the pipe to have a play movement in the openings and such a loose pipe fit usually causes a rattling and disagreeable noise. Further, with dandy rolls which are often constructed ten or more feet in length, the loose pipe mounting is very objectionable. The present invention is, therefore, designed to overcome these and other objections. When the dandy roll is constructed of considerable length and only supported in bearings at its ends, the middle part of the roll often sags causing the web of paper to pass through the machine without being properly water-marked. By employing a center ball bearing support for the roll, this sagging objection is removed and a distinct water-mark impression is made in the web of paper.

Referring in detail to the single figure of drawings:

1 designates the usual woven wire fabric of the roll which is suitably secured to the ring members 2, 3 and 4 in any suitable way, as brazing. Each of these members is formed with a cored out or annular recess 5, 6 and 7, in which the ball-race members 8, 9 and 10 are located and secured therein. The balls are indicated at 11. 12, 13 and 14 designate the other, or inner, ball-race rings. 15 designates collars on the inner ball-races for securing these races to the fixed shower pipe 16.

The collars 15 are of a size and so located in the cored out annular recesses 5, 6, and 7 as to provide the passageways 17, 18, 19 and 20 for the escape of water from the balls. The shower pipe is preferably composed of some non-corroding material, as brass. 21 designates water outlet openings in the shower pipe for permitting the water to enter the recesses 5, 6 and 7 for lubricating each of the ball bearings. By providing an additional ring support 3 at the center of the dandy roll, the wire 1 is maintained true throughout its entire length. The fixed non-corrosive shower pipe 16 provides a structure, in combination with the ball bearings, that is quiet in operation and that constantly lubricates these bearings, and, at the same time, maintains its shape throughout its entire length whereby the water-mark is clearly impressed on the moving web of paper.

The water from the openings 21 also enters the annular space between the pipe 16 and the hub bearings 22 and 23 at the opposite ends.

What I claim is:

1. A dandy roll construction comprising a tubular member composed of non-corroding material and formed with water discharging openings, a plurality of ball bearings mounted on the tubular member for rotatably supporting the woven wire fabric of the roll, ring members for securing the woven wire of the roll, the ball bearings being located adjacent the discharge openings.

2. In a dandy roll, the combination with a fixed tubular member for supplying water to the interior of the roll, ball bearing means for supporting the roll on the tubular member, and means for supplying water from the tubular member to the ball bearing means.

3. In a dandy roll, a fixed tubular shaft, a plurality of ball bearings on the shaft for rotatably supporting the roll, and means for supplying water to the bearings from the said shaft.

4. A mounting for a dandy roll comprising a fixed tubular shaft, a plurality of ball bearings mounted on the shaft, recessed hubs in which the ball bearings are located, the hubs being connected to rings to which the dandy roll fabric is secured, and means for supplying water from the tubular member for lubricating the ball bearings.

5. A dandy roll mounting comprising a fixed tubular shaft of non-corrosive material, as brass, and formed with water discharge openings, rings formed with recessed hubs for attaching the woven wire fabric thereto, the recesses in the hubs being designed for receiving a ball bearing which is supported on the fixed tubular shaft and means for supplying water from the tubular shaft to the ball bearings, as described.

In testimony whereof, I have hereunto signed my name at Springfield, in the county of Hampden, and State of Massachusetts, this 7th day of December, 1929.

PETER S. SINCLAIR.